United States Patent

[11] 3,591,831

| | | |
|---|---|---|
| [72] | Inventor | Andrew J. McConnell<br>Latham, N.Y. |
| [21] | Appl. No. | 868,811 |
| [22] | Filed | Oct. 23, 1969 |
| [45] | Patented | July 6, 1971 |
| [73] | Assignee | General Electric Company |

[54] HARMONIC FILTER PROTECTION MEANS
10 Claims, 3 Drawing Figs.

[52] U.S. Cl. .................................................. 317/12,
317/27, 317/31, 317/36, 317/53
[51] Int. Cl. ...................................................... H02h 3/38,
H02h 3/08
[50] Field of Search........................................... 317/12, 27,
53, 36, 31; 307/105; 321/9

[56] References Cited
UNITED STATES PATENTS
3,143,687  8/1964  Hjertberg...................... 317/12

3,319,120  5/1967  Fahlen.......................... 317/12
3,486,073  12/1969  Eriksson....................... 317/12

Primary Examiner—J. D. Miller
Assistant Examiner—Harvey Fendelman
Attorneys—J. Wesley Haubner, Albert S. Richardson, Jr., Frank L. Neuhauser, Oscar B. Waddell and Joseph B. Forman

ABSTRACT: A protection system and fault indicator for harmonic filters associated with high-voltage electric power lines. Residual fundamental-frequency currents passed by two such filters connected to the same line are compared in the current circuit of a power directional relay. The system is adjusted so that under normal operating conditions the net fundamental-frequency current in the current circuit of the relay is zero. If one of the two filters malfunctions, the resulting increase in its fundamental-frequency current actuates the relay in a sense that indicates which filter is in trouble.

PATENTED JUL 6 1971  3,591,831
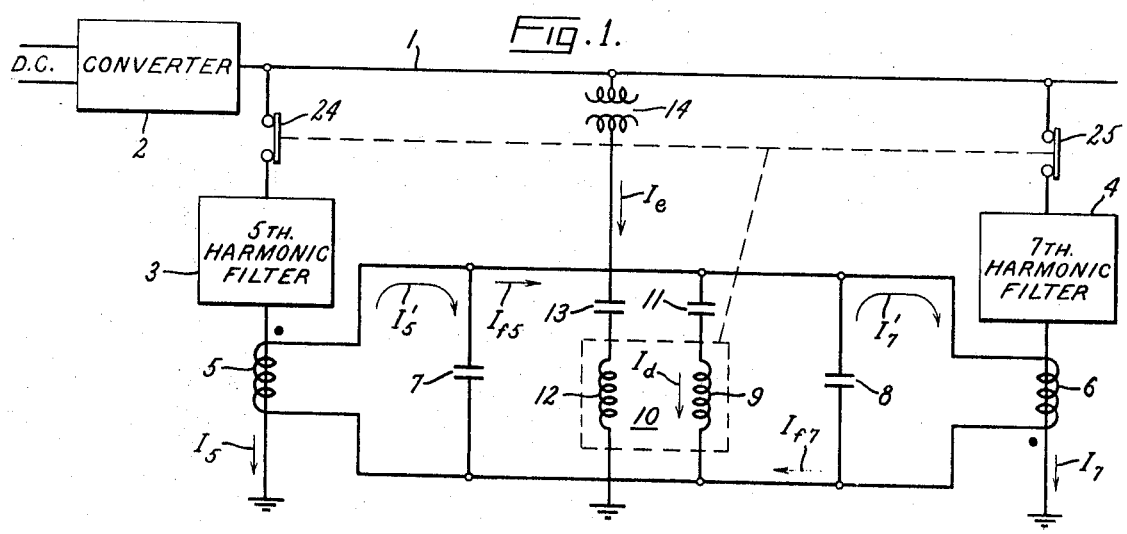
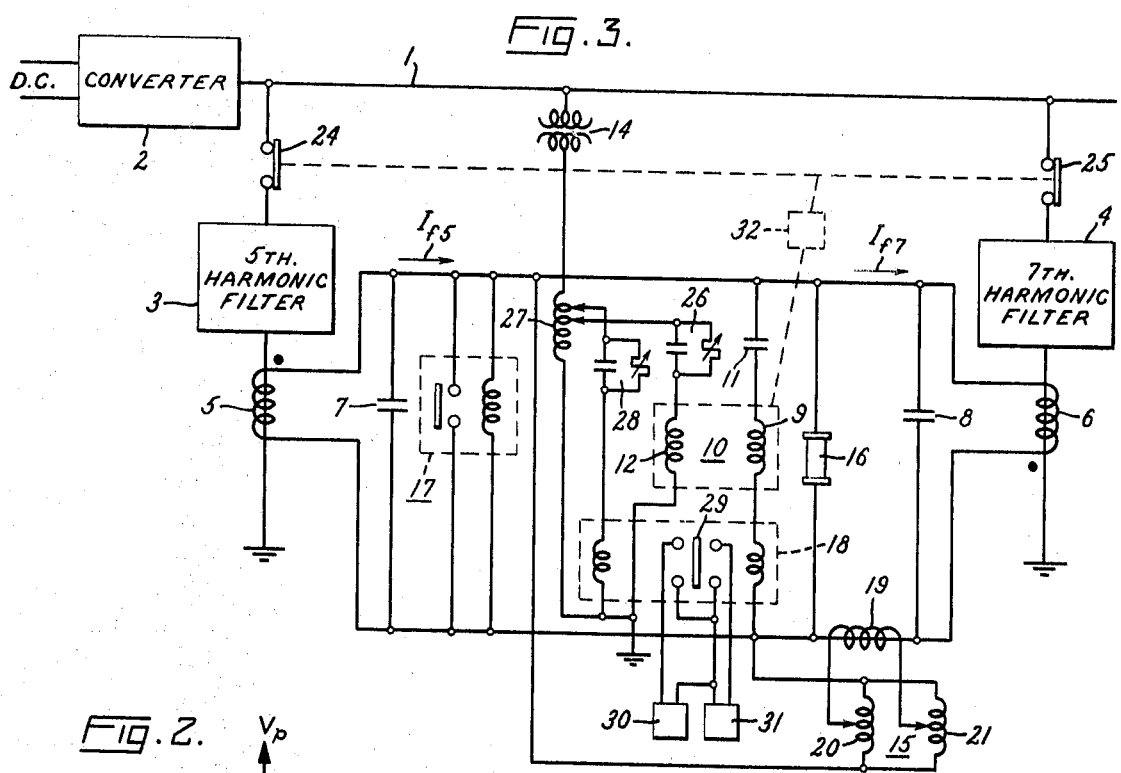
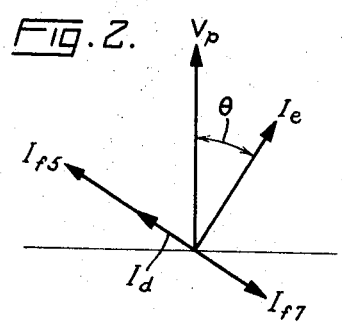
INVENTOR:
ANDREW J. McCONNELL,
BY Albert S. Richardson Jr
ATTORNEY

HARMONIC FILTER PROTECTION MEANS

BACKGROUND OF THE INVENTION

This invention relates generally to the protection of harmonic filters, and it relates more particularly to means for detecting malfunctions in shunt filters used to reduce unwanted harmonic-frequency current in power transmission lines.

In the transmission of bulk electric energy between polyphase alternating current (AC) systems, it is sometimes advantageous to use a high voltage direct current DC link which is coupled to the respective AC systems by electric power converters. In operation, such converters tend to generate undesirable superharmonic-frequency currents in the AC systems, particularly at an output terminal of the link. Harmonics are not a significant problem in most AC transmission where the waveform of the original sinusoidally generated current remains intact. But DC transmission involves inverting direct current by conductively switching it through alternative paths in a solid-state converter, and the resultant AC waveform is distorted by the presence of harmonic-frequency components.

In order to eliminate or attenuate the undesired harmonics, it is common practice to incorporate filters on the AC side of a converter. Such filters typically consist of L-C circuits which shunt the various harmonic-frequency currents from a phase conductor to neutral or ground. Typically a plurality of filters are used, each one tuned to damp a different characteristic harmonic in the AC system. See U.S. Pat. Nos. 3,038,134 and 3,290,578 for example.

Harmonic filters invariably pass a small quantity of fundamental-frequency current, though the harmonic component is several orders of magnitude greater than the fundamental. Since most of any given harmonic component is already passing through the filter circuit, should the filter capacitor develop a fault the increase in the already-large harmonic current component would be negligible. However, the fundamental current might change appreciably.

In the past, protection systems have been devised to monitor residual fundamental current flowing through harmonic filters. U.S. Pat. No. 3,319,120-Fahlen discloses a scheme wherein a normal current difference between two such filters is compared with an equal and opposite compensating current derived from line-to-ground voltage, and the net current that results when either filter fails is filtered and then applied to associated indicating means. This system, however, has two disadvantages. First, it makes no provision for indicating which of the filters being monitored has failed; and secondly, due to the initial discrepancy between the magnitudes of the harmonic and fundamental-frequency currents, it has not heretofore been possible to reject enough harmonic current to make it negligibly small in comparison with the already-small fundamental-frequency current. The indicating means is thus relatively insensitive to small changes in fundamental-frequency current.

The present invention overcomes these difficulties by providing a relay having both a potential circuit and a current circuit, each of which passes principally fundamental-frequency (hereinafter referred to as fundamental) current. The interaction of the quantities energizing these circuits is such that the harmonic rejection rate of the relay is the produce to the rejection rates of the respective circuits, thus providing much higher sensitivity than has heretofore been achieved.

SUMMARY OF THE INVENTION

It is thus an object of my invention to provide protection means for harmonic filter capacitors which is highly sensitive to small changes in fundamental current.

It is a further object of my invention to provide protection means for harmonic filter capacitors which will indicate which of two monitored filter systems has failed.

In one form of my invention, I provide a pair of current transformers, each of which is excited by current in a different harmonic filter connected between an AC conductor and ground or neutral. The secondaries of these transformers are connected with opposing polarities across the current coil of a power directional relay which is tuned to pass fundamental frequency and to reject the harmonics thereof. The potential coil of the relay is adapted to conduct current representing phase-to-ground voltage on the conductor. Since the fundamental-frequency voltage will be at least several orders of magnitude greater than harmonic-frequency voltage, the current in the potential coil is predominantly of fundamental frequency. Since the operation of the relay is dependent upon the interaction of like-frequency magnetic fields created by both the current and potential coils, the harmonic rejection capability of the system is the product of the harmonic rejection rates of the current and voltage coils. Further, by utilizing a directional relay with oppositely connected current transformers, the direction of relay response is caused to be a function of which transformer supplies the most fundamental-frequency current.

BRIEF DESCRIPTION OF THE DRAWINGS

The subject matter of the present invention is particularly pointed out and distinctly claimed in the concluding portion of the specification. For a better understanding of the invention, together with further objects and advantages thereof, reference should be made to the following description taken in connection with the accompanying drawings in which:

FIG. 1 shows a conductor shunted by harmonic filters which are connected to the protection system;

FIG. 2 is a phasor diagram showing the phase relationships of currents and voltages within the system;

FIG. 3 shows a conductor shunted by harmonic filters which are connected to a preferred embodiment of the protection system.

DESCRIPTION OF THE PREFERRED EMBODIMENTS

Referring now to FIG. 1, conductor 1 represents one phase of a three-phase AC electric power system which is coupled to a DC link by means of a solid-state converter 2. Between each phase of the AC system and ground there is connected a group of filters respectively arranged to damp or to suppress the different characteristic harmonics that exist in the system as previously explained. In order to explain the present invention, only one pair of harmonic filters, 3 and 4, needs to be considered herein, it being understood in practice that the phase conductor 1 has a plurality of different pairs of filters connected thereto and that corresponding sets of filters are associated with the other two phases of the power system.

The illustrated filters 3 and 4 are tuned to pass unwanted 5th and 7th harmonic-frequency currents $I_5$ and $I_7$, respectively. Nevertheless, as will be recognized by those skilled in the art, these filters will inevitably conduct a small amount of current of fundamental frequency (e.g., 60 Hertz). While this current is of a much smaller order of magnitude than harmonic currents $I_5$ and $I_7$, it is not entirely negligible.

The currents flowing through the harmonic filters induce secondary currents $I_5'$ and $I_7'$ in current transformers 5 and 6 respectively. By connecting the transformers with opposing polarities, as conventionally indicated by the dots at the ends of the secondary windings, the currents are constrained to be in opposing phase relationship. High pass filters, shown as capacitors 7 and 8, shunt the harmonic-frequency components of $I_5'$ and $I_7'$ back to transformer windings 5 and 6, and the difference between fundamental-frequency components $I_{f5}$ and $I_{f7}$ flows through the current circuit 9 of power directional sensing means 10. In the illustrated embodiments of my invention, I prefer to use a commercially available electromagnetic induction type power directional unit similar in construction to the relay described in the paper entitled "A New High-Speed Balanced-Current Relay" by V. N. Stewart published in 62 AIEE TRANS. 553-55 (Aug. 1943). The operating coils of this relay comprise the current circuit 9 which is connected in parallel with transformers 5 and 6 for energization in accordance with any abnormal difference between $I_{f5}$ and $I_{f7}$. A capacitor 11 is provided in series connection with these coils in order to tune the current circuit to pass fundamental current, thus enabling it to further reject the harmonic-frequency components of currents $I_5'$ and $I_7'$.

The restraint or polarizing coils of the power directional relay 10 comprise a potential circuit 12 which is energized by current $I_e$ derived from the voltage across the harmonic filters as reflected by a potential transformer 14 connected to the phase conductor or line 1. $I_e$ will have very little harmonic content because of the high ratio of fundamental-frequency voltage to harmonic voltage on the line. A capacitor 13 in series with the potential circuit 12 enables a desired phase relationship to be obtained between $I_e$ and line voltage (see below), and the resulting impedance of this circuit also contributes to the rejection of harmonic-frequency current in the polarizing coils of the directional relay 10. Thus $_e$ is predominantly of fundamental frequency.

Due to the presence of filters 3, 4, 7, 8, and the tuned current circuit of relay 10, the amount of harmonic-frequency current that can flow through the current circuit 9 is severely restricted. Nonetheless, the harmonic-frequency rejection characteristic of this circuit alone may not be sufficient to provide satisfactory operation if a standard overcurrent responsive relay were used. By utilizing a directional relay whose potential circuit 12 has good harmonic rejection capability as noted above, essentially no net operating torque is produced by harmonics in the current circuit and the relay normally remains in a quiescent or neutral state.

In the event of a capacitor fault in one of the harmonic filters 3 or 4, the fundamental-frequency component of current flowing through that filter increases appreciably. While the harmonic-frequency current is already of a large order of magnitude (e.g., 150 amps), the fundamental-frequency current is relatively low. The relay 10 is actuated in response to a small increase (e.g., 1.5 amps) in the fundamental current in the faulty filter.

The operation of the directional relay 10 depends upon the interaction of the magnetic fields created by like-frequency currents flowing simultaneously in its separate current and potential circuits, respectively. In particular, relay operating torque is proportional to the produce of the magnitudes of the fundamental difference current in the current circuit 9 and the fundamental current in the potential circuit 12 multiplied by the sine of the phase angle between them. Since harmonic frequencies are rejected by both circuits, the overall rejection rate of the protection system is the product of the rejection rate of the potential circuit and that of the current circuit and associated detection circuit.

FIG. 2 illustrates a condition, wherein the 5th harmonic filter 3 is malfunctioning, whereby the fundamental current $I_{f5}$ exceeds $I_{f7}$. The resulting difference current $I_d$ leads line voltage $V_p$ by an angle less than 90°. To maximize torque under such conditions, recalling that torque is proportional to the sine of the angle between the quantities $T_d$ and $I_e$, the capacitance value of capacitor 13 can be selected to cause the potential circuit current $I_e$ to lag $V_p$ by an appropriate angle $\theta$ such that $I_d$ will be nearly 90° out-of-phase with respect to $I_e$. The added capacitance increases sensitivity while only slightly reducing the harmonic rejection capability of this System. As soon as the magnitude of the quantity $I_d$ attains a relatively low threshold level, sufficient torque is developed to actuate the relay. The phase relationship of $I_e$ and $I_d$ determines the operating direction of the relay 10. In FIG. 2, $I_{f5}$ is greater than $I_{f7}$, with the result that the net fundamental difference current $I_d$ leads $I_e$ by 90°. If, however, $I_{f7}$ were larger than $I_{f5}$, the net current $I_d$ would undergo a 180° change of phase and would then lag $I_e$ by 90°. The reversed phase relationship causes the direction of torque exerted on the movable contact controlling element of the relay 10 to reverse, with the result that the sense of response is also reversed. The relay is equipped with conventional double-throw contacts (not shown), and the sense of response is indicated by which set of contacts is closed. In either case, actuation of the relay 10 will initiate a desired protective function which in FIG. 1 comprises the opening of a pair of normally closed switches 24 and 25 to remove the companion filters 3 and 4 from service.

FIG. 3 illustrates a preferred form of a protection system embodying the principles of my invention. The same numerals have been employed to indicate corresponding elements in FIGS. 1 and 3. Since equal fundamental currents $I_{f5}$ and $I_{f7}$ is not expected in practice, current balancing means generally indicated at 15 is provided for adding or subtracting a compensating current from the system, thereby eliminating net current flow through current coil 9 during normal conditions. Current balancing means 15 comprises a first current transformer 19 inductively coupled to a conductor carrying the filtered current output $I_{f7}$ of transformer 6 between filter capacitor 8 and relay current circuit 9; and second and third transformers 20 and 21 connected in parallel across the output terminals of transformers 5 and 6. The current transformer 19 is connected between taps on the windings of transformers 20 and 21. By varying the location of these taps, the magnitude and phase of current through transformer 19 and thus the magnitude and phase of compensating current induced into the system may be varied to ensure zero net current through the current circuit 9 of directional relay 10 under normal operating conditions.

The potential circuit 12 of the relay 10 shown in FIG. 3 includes adjustable means 26 for conveniently shifting the angle $\theta$ between its energizing quantity and the associated phase voltage, whereby the desired angle of maximum torque can be obtained in spite of variations in current transformer characteristics that are sometimes encountered from one installation to another. As shown the adjustable means 26 comprises the parallel combination of a capacitor and a variable resistor. This combination is connected between the polarizing coils of the relay 10 and an autotransformer 27 which in turn is coupled to the line 1 via transformer 14.

In the actual use of protective systems such as the one disclosed herein, it is desirable to provide over-voltage protection means. Should one harmonic filter be inadvertently left out of service, for instance, excessive voltage levels might be impressed across the relay, thereby damaging its components. To prevent this, over-voltage protection means 16, composed of a material having a negative voltage coefficient of resistivity such as Thyrite is placed in parallel with the relay 10. While peak voltages can be limited in this manner, it is not economical to provide more than momentary protection by means of such a device. To provide protection for longer periods, I provide a conventional over-voltage relay 17 having an operating coil and normally open contacts connected in parallel with the current circuit 9 of relay 10. Upon detection of undesirably high voltage levels in the system, the contact of relay 17 closes, thereby short circuiting the secondaries of the current transformers 5 and 6.

In order to provide a convenient indication of which one of the two filters 3 and 4 malfunctioned, the system illustrated in FIG. 3 includes an alarm unit 18 which is a duplicate of the power directional sensing means 10. Thy current circuit of the alarm unit 18 is connected in series with the current circuit 9 of the relay 10 for energization in accordance with any abnormal difference between the fundamental-frequency currents $_{f5}$ and $I_{f7}$. The potential circuit of unit 18 is connected in parallel with the potential circuit 12 for energization by an electric quantity which is derived from line voltage by the transformers 14 and 27. Phase shifting means 28 permits adjustment of the angle by which this quantity lags line voltage. The taps of the autotransformer 27 are preferably selected so that the alarm unit 18 is more sensitive in its response to difference current than is the relay 10. Consequently the alarm unit will operate when the difference current in its current circuit attains a magnitude that is even lower than the threshold level at which the relay 10 is actuated.

When the alarm unit 18 is actuated, it initiates alternative protective functions depending on which filter is in trouble. If the 5th harmonic filter 3 is faulty, the the fundamental-frequency difference current $I_d$ will have a relatively leading phase relation, as previously explained, and the movable contact member 29 of the alarm unit is driven from its neutral position in a left-hand direction (as viewed in FIG. 3) to bridge a first set of contacts, thereby actuating suitable means 30 for indicating that filter 3 needs repair. On the other hand, if the 7th harmonic filter fails, the torque or driving force will move member 29 in the opposite direction to bridge another set of contacts associated with means 31 for indicating that the filter 4 needs repair.

Abnormal transient current levels occurring when the power system is first energized may cause short term torques sufficient to close the contacts of the directional relay 10. By adding time delay means 32 as shown in FIG. 3, opening of the switches 24 and 25 can be temporarily delayed upon actuation of the relay 10, thereby enabling the filters 3 and 4 to remain in service if the detected abnormal condition exists for only a few cycles.

From the foregoing description, it ill be seen that I have provided improved protection means for capacitor filters used with a single-phase conductor. It will also be apparent that the system described herein provides a high rate of harmonic rejection and is highly sensitive to fundamental-frequency current, and that its directional response makes it possible to know immediately which of two protected filters is faulted.

As will be evident from the foregoing description, certain aspects of the invention are not limited to the particular details of the embodiments illustrated. For example, the electromagnetic induction type directional relay 10 could be replaced by equivalent solid-state circuits performing the same function. In view of the various alternatives that have been suggested or that will occur to those skilled in the art, I intend herein to cover all such modifications and applications as do not depart from the true spirit and scope of the invention.

What is claimed as new and desired to be secured by Letters Patent of the United States is:

1. In a protection system for a group of different harmonic filters comprising at least first and second parallel filters connected to a conductor carrying alternating current of fundamental frequency:
   a. power directional sensing means comprising separate potential and current circuits, said sensing means being operative to initiate a predetermined protective function in response to the simultaneous energization of said circuits by out-of-phase electrical quantities having like frequencies;
   b. first means for supplying said potential circuit with a first quantity derived from fundamental-frequency voltage across said group of filters; and
   c. second means for supplying said current circuit with a second quantity essentially representing any abnormal difference between fundamental-frequency currents flowing through the first and second filters, respectively.

2. The protection system of claim 1 in which said first means includes phase shifting means for obtaining a predetermined phase relationship between said first quantity and said voltage.

3. The protection system of claim 1 in which said second means includes means for restricting harmonic-frequency current in said current circuit.

4. The protection system of claim 1 in which said second means includes compensating means responsive to any normal difference between said fundamental-frequency currents for ensuring that the magnitude of said second quantity is zero during normal conditions.

5. The protection system of claim 1 which includes overvoltage responsive means connected in parallel with said current circuit for preventing excessive voltage thereacross.

6. The protection system of claim 1 in which said sensing means is constructed and arranged to initiate one protective function if said second quantity has a leading phase relation to said first quantity and to initiate another protective function if said second quantity has a lagging phase relation to said first quantity.

7. The protection system of claim 1 which includes a second power directional sensing means having a potential circuit connected in parallel with the potential circuit of the first-mentioned sensing means for energization by another electrical quantity derived from said voltage, and having a current circuit connected in series with the current circuit of said first sensing means, said second sensing means being operative in response to the simultaneous energization of its circuits for initiating one protective function when said second quantity has a leading phase relation to said other quantity and for initiating another protective function when said second quantity has a lagging phase relation to said other quantity.

8. The protection system of claim 7 in which said second sensing means is arranged to operate when said second quantity attains a magnitude lower than its threshold level at which said first sensing means is actuated.

9. The protection system of claim 7 which includes means for temporarily delaying said predetermined protective function upon actuation of said first sensing means.

10. The protection system of claim 1 in which said sensing means is arranged to operate in delayed response to the simultaneous energization of its circuits by said first and second quantities, respectively.